United States Patent
Chopra et al.

(10) Patent No.: US 11,915,324 B2
(45) Date of Patent: Feb. 27, 2024

(54) 360 DEGREE FRAMEWORK

(71) Applicant: VISA INTERNATIONAL SERVICE ASSOCIATION, San Francisco, CA (US)

(72) Inventors: Akshay Chopra, Singapore (SG); Matthew Dill, Singapore (SG)

(73) Assignee: Visa International Service Association, San Francisco, CA (US)

( * ) Notice: Subject to any disclaimer, the term of this patent is extended or adjusted under 35 U.S.C. 154(b) by 128 days.

(21) Appl. No.: 16/621,602

(22) PCT Filed: Jun. 16, 2017

(86) PCT No.: PCT/US2017/037937
§ 371 (c)(1),
(2) Date: Dec. 11, 2019

(87) PCT Pub. No.: WO2018/231250
PCT Pub. Date: Dec. 20, 2018

(65) Prior Publication Data
US 2020/0111171 A1    Apr. 9, 2020

(51) Int. Cl.
G06F 16/2458    (2019.01)
G06F 16/2457    (2019.01)
G06F 16/23      (2019.01)
G06Q 30/02      (2023.01)
G06Q 30/00      (2023.01)
G06F 9/46       (2006.01)
G06Q 40/12      (2023.01)
G06Q 30/04      (2012.01)
G06Q 40/02      (2023.01)

(52) U.S. Cl.
CPC .............. *G06Q 40/12* (2013.12); *G06Q 30/04* (2013.01); *G06Q 40/02* (2013.01)

(58) Field of Classification Search
CPC ......... G06Q 40/12; G06Q 30/04; G06Q 40/02
See application file for complete search history.

(56) References Cited

U.S. PATENT DOCUMENTS

| | | | |
|---|---|---|---|
| 7,469,246 B1* | 12/2008 | Lamping | G06F 16/353 |
| 8,639,567 B2* | 1/2014 | Winters | G06Q 30/02 |
| | | | 705/14.1 |
| 2004/0260694 A1* | 12/2004 | Chaudhuri | G06F 16/2468 |
| | | | 707/999.005 |
| 2008/0221970 A1* | 9/2008 | Megdal | G06Q 30/0204 |
| | | | 705/7.33 |
| 2008/0262925 A1* | 10/2008 | Kim | G06N 20/00 |
| | | | 705/14.27 |

(Continued)

FOREIGN PATENT DOCUMENTS

EP    1785931 A1    5/2007

OTHER PUBLICATIONS

International Search Report and Written Opinion dated Oct. 6, 2017 for PCT/US2017/037937, 12 pages.

*Primary Examiner* — Talia F Crawley
(74) *Attorney, Agent, or Firm* — K&L Gates LLP

(57) ABSTRACT

An architecture of connected servers supports data analysis with each server using a pattern matching algorithm to determine if an individual's traits match a predetermined species or if a new species should be established. Each server may have a dedicated database and receive information from relevant sources including various reporting agencies.

12 Claims, 6 Drawing Sheets

(56) References Cited

U.S. PATENT DOCUMENTS

| | | | |
|---|---|---|---|
| 2009/0271305 A1* | 10/2009 | Lal | G06Q 40/00 705/35 |
| 2010/0088124 A1* | 4/2010 | Diefendorf | G06Q 40/08 705/4 |
| 2011/0004483 A1* | 1/2011 | Ting | G06F 16/951 707/E17.108 |
| 2011/0231305 A1* | 9/2011 | Winters | G06Q 30/02 705/1.1 |
| 2011/0246268 A1* | 10/2011 | Satyavolu | H04M 15/8044 705/14.4 |
| 2011/0251934 A1* | 10/2011 | Satyavolu | G06Q 40/12 705/30 |
| 2012/0004964 A1* | 1/2012 | Satyavolu | H04M 15/745 705/14.25 |
| 2012/0004965 A1* | 1/2012 | Satyavolu | G06Q 20/387 705/14.25 |
| 2012/0004970 A1* | 1/2012 | Satyavolu | G06Q 30/0224 705/14.25 |
| 2012/0036013 A1* | 2/2012 | Neuhaus | G06Q 30/02 706/47 |
| 2012/0066065 A1* | 3/2012 | Switzer | G06Q 30/0255 705/1.1 |
| 2013/0151388 A1* | 6/2013 | Falkenborg | G06Q 40/02 705/35 |
| 2013/0238356 A1* | 9/2013 | Torii | G16H 50/80 705/2 |
| 2013/0325681 A1* | 12/2013 | Somashekar | H04M 15/851 705/35 |
| 2014/0089044 A1 | 3/2014 | Nipko | |
| 2014/0143109 A1* | 5/2014 | Satyavolu | G06Q 30/0215 705/35 |
| 2014/0172560 A1* | 6/2014 | Satyavolu | H04M 15/8044 705/14.53 |
| 2016/0086222 A1* | 3/2016 | Kurapati | G06Q 40/08 705/14.53 |
| 2016/0170814 A1* | 6/2016 | Li | G06F 9/542 719/318 |
| 2016/0246871 A1* | 8/2016 | Singh | G06F 16/285 |
| 2019/0388787 A1* | 12/2019 | Padmanabhan | G09B 19/00 |
| 2020/0250185 A1* | 8/2020 | Anderson | G06Q 30/01 |

* cited by examiner

360 DEGREE FRAMEWORK

CROSS-REFERENCE TO RELATED APPLICATIONS

This application is a national stage entry under 35 U.S.C. 371 of International Patent Application No. PCT/US2017/037937, filed on Jun. 16, 2017, and designating the United States, the entire contents of which are incorporated herein by reference.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

As more data becomes available about a person's life, needs, and interactions, it becomes more difficult to develop a consistent narrative about the user from a product or service design perspective.

SUMMARY

In an embodiment, a framework is used to develop a single, comprehensive view of a person's financial habits and needs using the individual's behaviors, activities, needs, and other attributes in general areas such as purchases, transfers, investing, savings, borrowing, and tracking. When these attributes are organized into the framework, insights can be drawn about the person's key behaviors, unmet financial needs, and pain points in managing finances, among others. With these insights, innovations that solve real-world problems may be developed.

The framework may include a number of servers that interact with related systems to accumulate data and to perform the attribute matching required for characterization data corresponding to an unclassified person into a known species or to determine that a new species should be added.

BRIEF DESCRIPTION OF THE DRAWINGS

The figures depict a preferred embodiment for purposes of illustration only. One skilled in the art may readily recognize from the following discussion that alternative embodiments of the structures and methods illustrated herein may be employed without departing from the principles described herein.

DETAILED DESCRIPTION

Traditionally, new products and services for individuals, particularly financial servers were developed often based on the ability of a system provide a product or service. That is, as new technologies became available, such as interstate banking, automated teller machines, ACH transfers, or paperless check clearing, various services were developed to take advantage of that new capability. In some cases, such products and services were developed based on the perceived needs of a target audience, such as business travelers or retirees. However, now that networked systems for payments and clearing have reached an almost limitless potential, such a technology driven product development plan may result in ineffective, frivolous, or even annoying product and service offerings. Another approach to such design considers one single person and characterizes their activities, transactions, goals, stage of life, etc., to design one of a kind products, or at least, more than one-size-fits all products. However, the amount and kind of data available for this characterization can be difficult to organize and evaluate.

A process for creating product offerings identifies various groups or species of people by lifestyles and needs in different categories, such as entertainment, healthcare, or financial management. To accomplish this several characteristics for a species are selected that are indicative of the species and that can be easily modeled. For example, some characteristics for different financial management species may be account status, purchase types, transfers, investments, savings, and more, as discussed more below. Other areas, such as entertainment may track an individual's time and spend on various live, broadcast, streamed, or unplugged (e.g., books) entertainment.

When the values for the characteristics are collected for an unidentified person (or sample), the collected values may be compared to a known species to determine if the match between the sample and the known species is sufficient to add the sample to the known species. If not, the sample may be compared successively to other known species to find a match. In the case where no match is found, the sample may be added as a new species.

In a product development environment, the ability to identify unique species of users allows different product ideas to be evaluated against the potential users from each identified species. The identification of new species creates the opportunity to evaluate whether a new product or service can be advantageous for individuals from that species.

Figure 1:
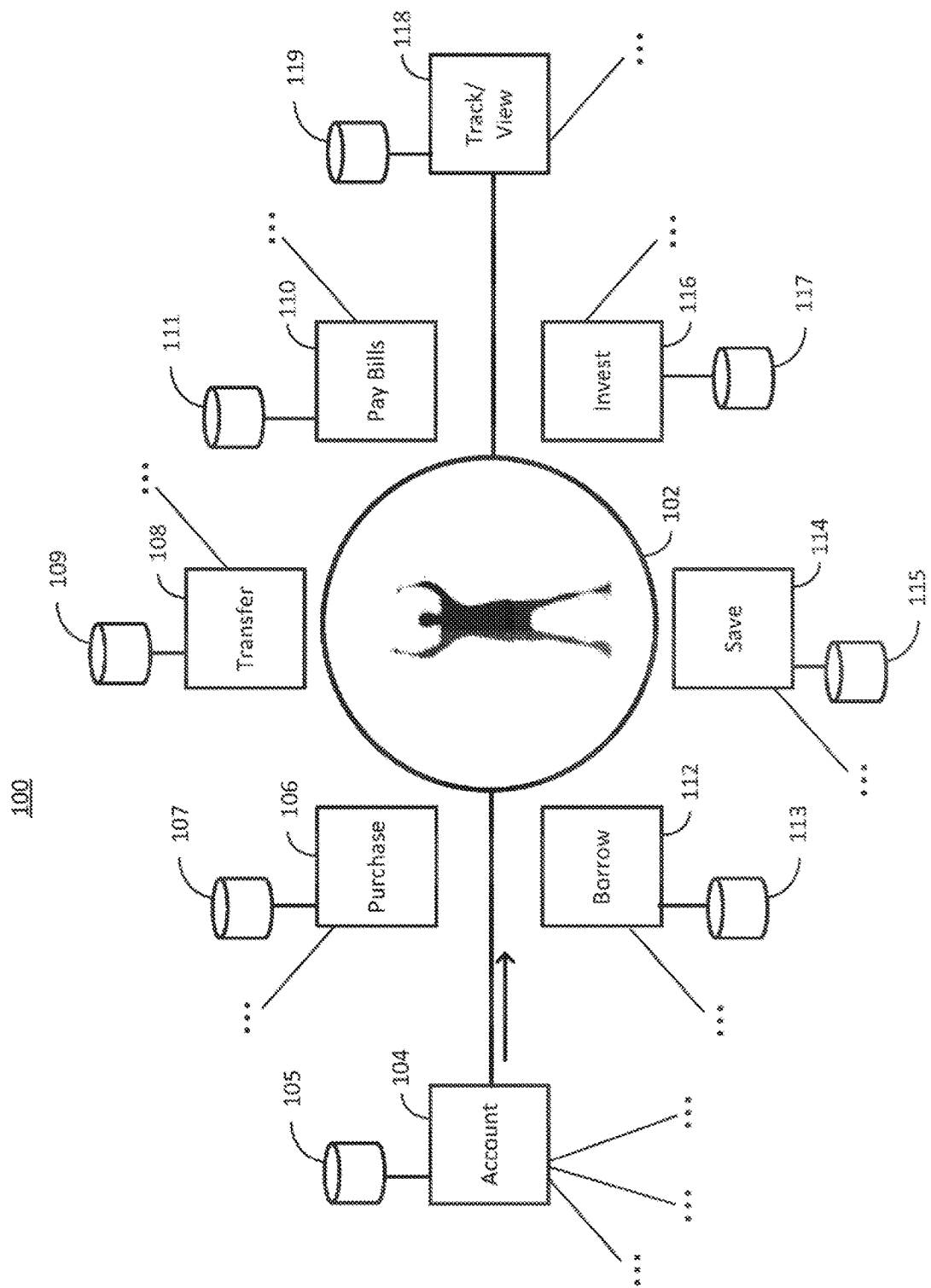
FIG. 1 is an illustration of an architecture for category characterization in accordance with the current disclosure.

Turning to FIG. 1, a representative architecture 100 illustrating categories for characterization of financial management species is illustrated. The categories are representative of interactions an individual 102 may have with any one of several institutions such as merchants, service providers, financial institutions, government agencies, etc. Data may be collected relative to each category, in some instances using a separate server for each category. The respective servers may collect data from multiple sources relevant to the data involved with the goal of developing a model representing the individual.

In one exemplary embodiment, the various servers may use the data to place the individual on one or more ranges related to characteristics associated with these attributes with the ultimate goal of modeling the individual from, in the illustrated example, a financial aspect.

The model may have two-fold usefulness. First, the model may allow a financial institution to view its customers holistically on an individual level so that the institution can develop the services and features that are tailored to the individual needs of different users as opposed to simply offering a traditional suite of services. Second, the model may help fit an individual into the right services from a wide range of services that may best meet his or her needs in terms of investments, borrowing, account-to-account transfers, monitoring tools, etc., because the services were driven by individual needs from the beginning. As gaps in services are identified by continued modeling of individuals, services may be added to fill those gaps.

Figure 2:
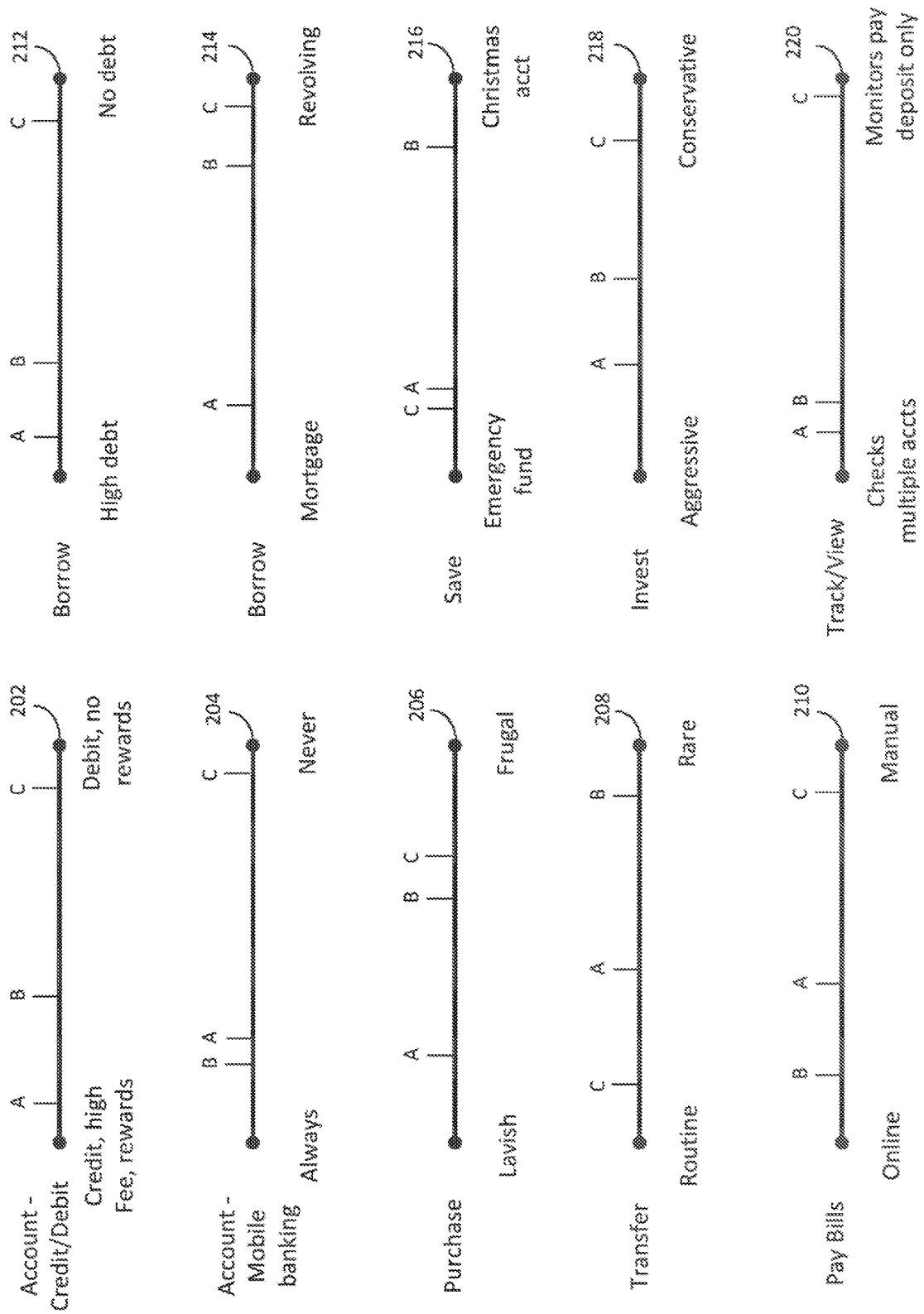
FIG. 2 illustrates various exemplary range categories associated with the architecture of FIG. 1.

Data pertaining to an individual may be mined with a fine degree of granularity in order to characterize an individual. One such process may place an individual on a series of range values over many different aspects of interest. In one example, one range may be self-exclusive, such as high end credit instrument at one end and no-fee, no-feature debit card on the other. Another range may be relative to a having a brick and mortar bank account at one end to mobile on-line banking at the other. In another example, though, the ranges may simply be a measure of participation in a particular feature, for example, no mobile banking at one end and exclusively mobile banking at the other. Representative range measurements for various servers are depicted in FIG. 2 and discussed below.

An account server 104 may discover and store in a database 105 activity related to interest in or establishment of new banking relationships including business accounts, personal bank accounts, credit cards, wallet accounts, mobile banking, or more, that may be indicative of the individual's financial profile. The account server 104 may determine values for each characterization which may be expressed in one or more ranges.

The database 105 may receive data from various reporting agencies such as credit bureaus, card issuers, or financial clearinghouses. The data may include account types, institution types, age of accounts, balances, and the individual's credit score.

Continuing with FIG. 1, three servers above the mid-line generally correspond to cash or budget management, that is, purchases, transfers, and bill payment. A purchase server 106 and its corresponding database 107 may aggregate information about a person's spending habits and expense categories. Examples of these may include a daily coffee at a local coffee shop, buys flights and hotels for frequent business travel, and buys groceries via a home delivery service. A profile of the purchase types and frequency may be used to characterize personal tastes as an element of species association. Transfers, that is, the transfer of funds between internal and external accounts may be monitored and modeled at the transfer server 108 and its corresponding database 109. Transfers include funds being transferred out, such as between a parent and a college student, or between a worker and family members back home. Transfers also include funds being received such as rental payments from income property or the aforementioned college student receiving funds from a parent.

A bill payment server 110 and its corresponding database 111 may monitor the individuals accounts or automatic bill paying services to determine the frequency, amount, and duration of payments made to outside product and service providers. By monitoring bill payments, the server 110 may identify use patterns that include time of day of payments, mobile device use, or limitations on types of bills paid such as vendor category or value. Of particular interest may be those bills that the user chooses to pay manually or by phone rather than online. By understanding these preferences, an institution may determine services or products that will encourage an individual to move more payment activity to an online service or at least how to make the services that the individual does use easier and more intuitive. These products or services may include automatic services, text or email message transactions, smartphone applications, smart watch applications, or higher security such as two-factor authentication.

As illustrated in FIG. 1, the three servers below the mid-line can generally be classified as wealth management and encompass debt, savings, and investments. Borrowing or debt level can be an indicator of, among other things, poor financial management or a savvy investor that leverages assets. A borrow server 112 and its database 113 may be used to collect and store information about an individual's borrowing habits. Data about borrowing may involve both revolving and secured borrowing, total debt, payment amounts, interest rates, and more. An analysis of borrowing can lead to improved ways for an institution to provide funding to an individual or a project as well as to develop ways to help individuals manage unhealthy debt loads.

Similar to debt, savings is a measure of an individual's financial health. Savings levels are a measure of financial discipline. A savings server 114 and savings database 115 collect, store, and analyze information about an individual's savings habits including amounts, frequency of contributions and withdrawals, uniformity of contributions and withdrawals, savings compared to income and debt, etc.

An investment server 116 and its related database 117 track and measure an individual's investments, generally considered outside regular savings as viewed from the save server 114. The investment server 116 may collect and analyze data about the individual's short-term and long-term investments, total capital, return rates, risks, risk tolerance, allocation of assets and more. Stocks, bonds, annuities, insurance products, certificates and other investments may all be incorporated in an analysis of investments.

A tracking server 118 may watch the watcher, that is, track and analyze how an individual chooses to monitor the assets and transactions in one, several, or all of the other areas tracked by the servers discussed above. More specifically, the tracking server 118 may collect data on what accounts and transactions are tracked, how frequently the individual checks, from what platform (e.g., mobile or computer), in relation to other events, seasonal changes, etc.

As discussed above, the account server 104 may use the data to place the individual on one or more ranges related to characteristics associated with these attributes with the ultimate goal of modeling the individual from, in the illustrated example, various financial aspects. Turning to FIG. 2, representative ranges for each of the above-described servers/aspects are illustrated. This is only an exemplary embodiment and should not be construed as either requiring a range for each server or that a particular server may only use a single range. For example, as illustrated the borrow server 112 is shown as having multiple categorization ranges. In other embodiments there could be a dozen or more categorization ranges for an individual aspect.

As shown in FIG. 2, a first account range 202 may be based on data from the account server 104 and database 105. At one end is a credit account with a high fee and lucrative rewards offerings. At the other end is a simple debit card with no fee and no rewards. Three representative individuals, A, B, and C are depicted on this range 202, and on each other range depicted in FIG. 2. In this example, the A individual is near the top end of credit accounts, while B is near the middle and C is close to the low end. These placements do not reflect at all on credit worthiness, lifestyle, affluence, or suggest that each of these individuals has only one credit instrument. The placement is merely an indication of the user's overall affinity to the range with respect to this one aspect of finances and may be based on an analysis of data gathered by the account server 104. In the case where an individual may have multiple credit instruments across a broad range, an algorithm may select the placement on the range based on number of cards at each spot, frequency of use of each card, total monthly spend on each card, average balance on each card, or others. As can be seen, the placement on the range 202 may be relatively complex but as the number of individuals who are characterized increases, this and other similar algorithms may be fine-tuned to achieve accurate species identifications.

Another account server 104 related range may be a second account range 204 that captures propensity for mobile banking where one end is exclusively uses mobile banking and the other end is never uses mobile banking. This range 204 does not capture ATM, mail, online, or in-person banking traits, which all could be additional ranges for the account server. However, an exhaustive list of possible ranges for each server type is beyond the scope of this disclosure.

The purchase server 106 may collect and process data for placement of individuals on a purchase range 206 depicted the spending patterns of each individual from lavish to frugal. This characterization may be based on total spend, the type of store frequented, or the actual items purchased. For example, repeated purchases of jewelry and fine art may be characterized as lavish spending while a majority of purchases for food and household essentials may be characterized as frugal spending. The transfer server 108 may place individuals on a transfer range from routine to rare based on actuals transfers in and out of one or more accounts. What counts as routine, rare, or in between may be subjective or simply determined over time by sampling individuals and identifying transfer frequencies that are indicative of different species of financial system users. A pay bills range 210 may place individuals on a range based on whether bills are paid via online accounts or manually, such as by check. Possible variables that could be included in other ranges include ETF transfers, account direct withdrawals, online via vendor website, etc.

Two borrow-related ranges, debt range 212 and debt-type range 214 measure total debt and type of debt, respectively. The debt range 212 simply measures total debt and may be based on an absolute value of debt or a relative range such as debt-to-income or debt-to-assets. The debt-type range 214 may measure how much debt is secured, such as a home mortgage vs. how much debt is unsecured, such as credit card debt. In this case, the range may be based on a simple ratio of the two values, although other measures could be used such as interest amounts on both types of debt.

A savings range 216 may be one of several characterizations of savings. The savings range 216 in this embodiment may measure general savings vs. dedicated savings, based on correspondence between regular amounts put into the account and periodically withdrawn vs. amounts simply deposited and left for an indefinite period of time. Other metrics for savings may be calculated such as savings to debt or savings rate to income.

Investment characterizations based on data collected at the investment server 116 may have numerous ranges as well. In the illustration of FIG. 2 an investment range 218 may measure investment types based on level of risk of investments, from aggressive to conservative. Obviously, other measurements can be made similar to other measurements above such as investments-to-income and investments-to-debt.

The tracking server 118 may collect data that can be used to place individuals on any of several ranges. These may include frequency of monitoring accounts, mobile applications vs. web-based access, or as illustrated, what accounts get checked—from multiple accounts to a single account.

Placing individuals on ranges is a process for characterizing individuals and ultimately placing them in species having similar traits. However, as will be discussed below, the process of matching individuals to species can be fine-tuned so that it is possible to narrow the criteria to a "species of one" if so desired.

Species may be predetermined so that if one or more traits meet certain criteria, an individual is placed in that species. An embodiment discussed in FIGS. 3 and 4A-4C, illustrates but one method for matching individuals to species.

As discussed above, each of the servers 104, 106, 108, 110, 112, 114, 116, 118 may have associated characteristics or traits with individual range values for each. Correspondingly, each characteristic or trait may be associated with one or more services associated with that trait. Some may be self-evident. For example, if an institution wants to appeal to a species that uses a high function credit card (the left end of characteristic 202), the institution must offer a high function card. Other characteristics may have less obvious services, such as the borrow characteristic 212. In this case, a "no debt" individual may want simple banking services, such as checking accounts, with little or no fees and free tools such as online bill pay.

For each characteristic, one or more services may be identified that support that characteristic. More than one service may be associated with certain characteristics, especially those that have ranges with opposite ends such as mortgage (secured credit) vs. revolving (unsecured) credit. In these cases services for both secured and unsecured lines of credit may be needed. However, some characteristics may involve only one service, such as range 210 with online bill pay vs. manual bill pay. Here, only online bill pay may be required since there is no particular service (other than checking) needed for an individual that pays bills by regular mail.

Figure 3:
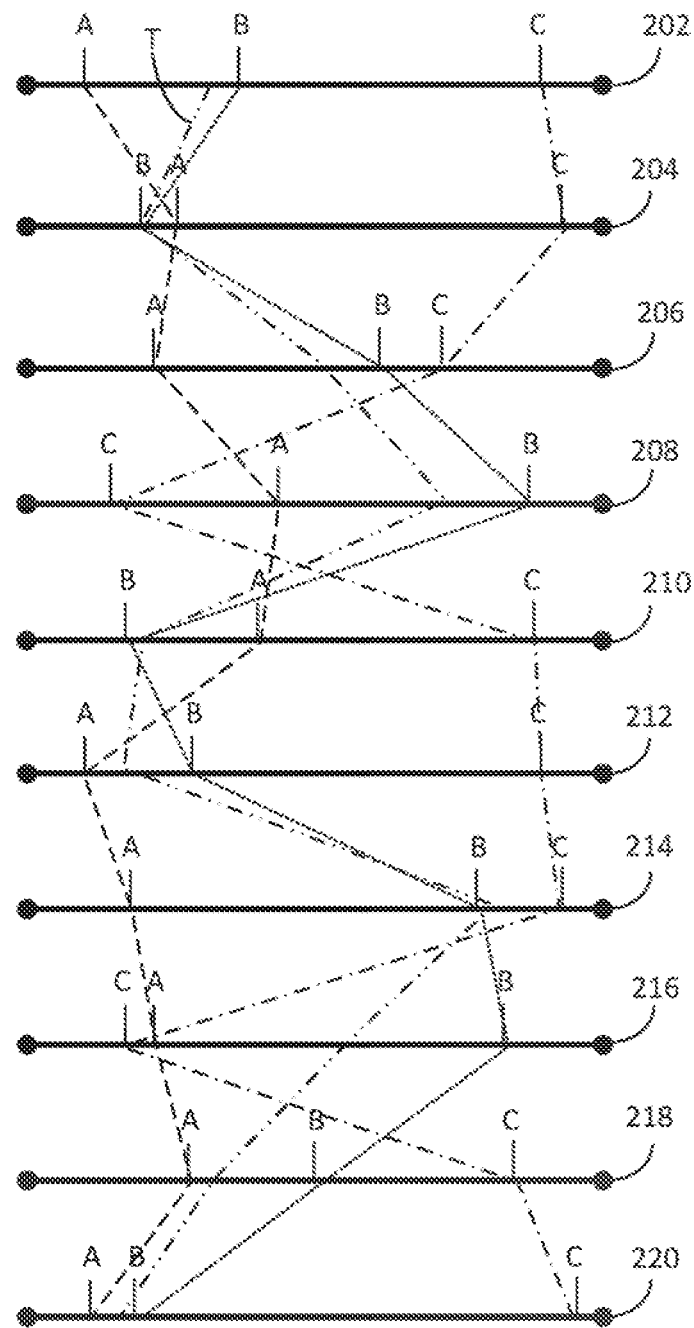
FIG. 3 illustrates an overlay of range values in an exemplary embodiment.
Figure 4C:
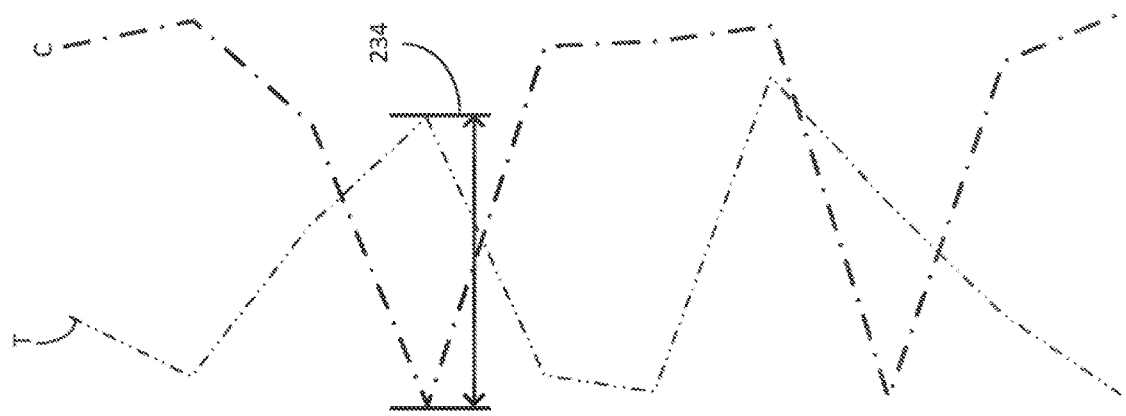
FIGS. 4A-4C illustrate distance measurement between various species and an unclassified sample.
Figure 4B:
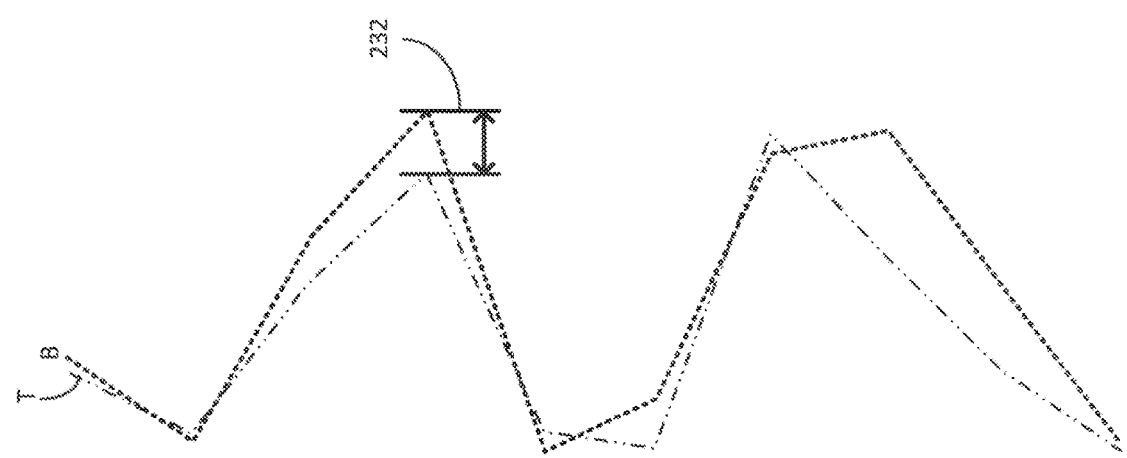
Figure 4A:
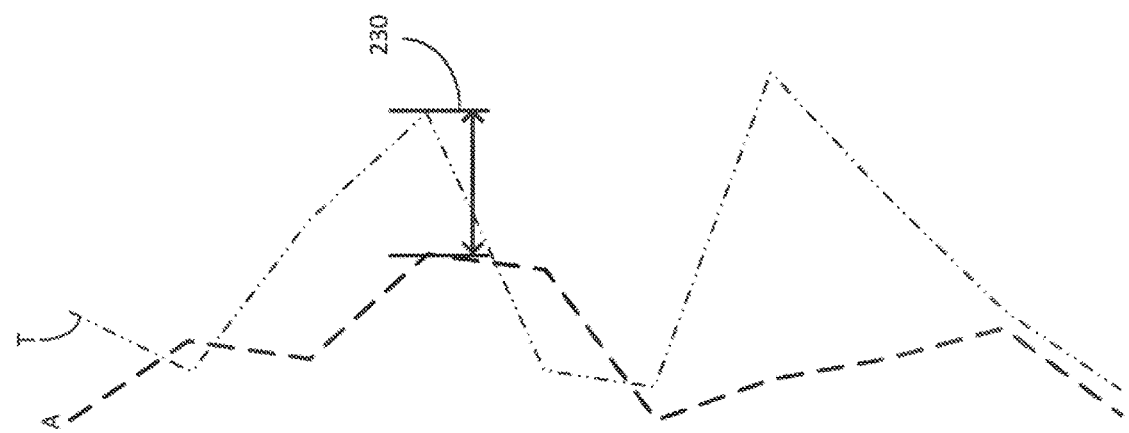

FIG. 3 depicts each of the ranges 202-220 from FIG. 2 arranged vertically. Also illustrated are the data for individuals A, B, and C from FIG. 2 as well as a test individual T. The path of the lines determines a curve that is representative of that individual. Determining whether T is closest to A, B, or C may be determined mathematically as illustrated in FIGS. 4A, 4B, and 4C, which show the graphs for individuals A, B, and C respectively along with individual T. For each trait, there is a distance between the original graph of A, B, or C and the corresponding point for the graph of T. The distances for the range 208 from FIG. 2 for the respective figures are shown as distances 230, 232, and 234 in FIGS. 4A, 4B and 4C. In this illustration, it is observable that the distance 232 is less than the distances 230 and 234. When the sum of all the distances for ranges 202-220 are compared, the graph of T is found to be more similar to the graph of B than that of A or C. If the sum of distances is less than a threshold value, T may be added to the species represented by individual B. If the sum of distances is above the threshold value, T may be generated as a new species. By adjusting the threshold value, the granularity with which new species are generated may be broadened or narrowed to be very inclusive or very exclusive, to the point of requiring an identical match in order to be matched to an existing species. Numerous graph matching or distance measurement techniques are known, including, average error, root-mean-square deviation, Hausdorff distance, partial Fréchet distance, or others. These different techniques emphasize or de-emphasize different elements such as weighting particular values or the treatment of outliers.

Each of these matching techniques allows development of a figure of merit that can be compared against a threshold value. Changing the threshold value and iterating through previously captured data for all individuals allows reclassification to see the effect of exclusivity on the number of species needed to accommodate each individual. Other algorithms may be used that allow sensitivity to individual characteristics to be determined. In all cases, variations in threshold value or trait weighting aid in generation of species that have a higher relevance to various needs associated with the banking experience.

As discussed above, each characteristic or trait may have associated services, e.g., a species that uses secured credit looks for an institution with mortgage and automobile loan instruments. Each identified species, by way of having a defined set of characteristics may then be associated with the services required to support that species. When an individual is identified as being a part of a particular species, the services associated with that species may be compiled using the sum of the individual services associated with those characteristics. When an institution is interested in attracting that species, the institution may compare the services they offer to the services needed by that species. In an embodiment, a database of the services needed but not offered by the institution may be created so that management can generate reports associated with the services shortfall. In an embodiment, an analysis tool may generate executable code that may be sent to a display device 262 (FIG. 5) as is discussed more below.

Figure 5:
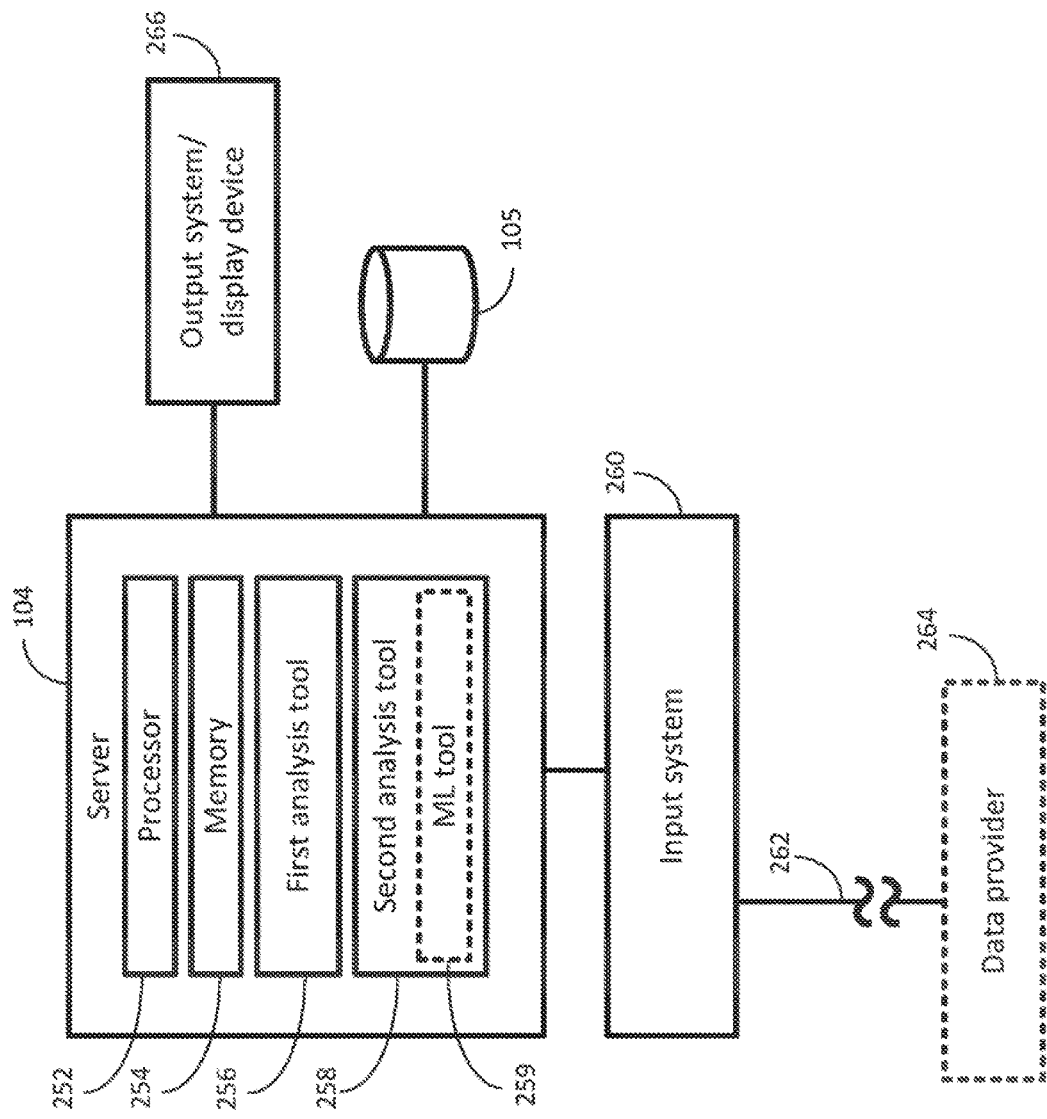
FIG. 5 is a block diagram of a representative component of the architecture of FIG. 1.

FIG. 5 is a block diagram of an exemplary characteristic server, in this case, server 104 and database 105 of FIG. 1. Each of the other servers 106, 108, 110, 112, 114, 116, 118 may have a similar architecture, with differences as described below. The server 104 may have a processor 252 and memory 254 that serve to execute stored executable code and data for operation of the server. Elements stored in the memory may include an operating system, utilities, program code, applications, and services such as networking support. The server 104 may have, among other hardware, firmware, and modules, a first analysis tool 256. The first analysis tool 256 may support processing data received via an input system 260 for the purpose of placing a user on a range, such as one of the ranges discussed above or a different range. In an embodiment, each server 106, 108, 110, 112, 114, 116, 118 may support at least one first analysis tool 256. A second analysis tool may conclude from the placement of the user on the various ranges if the user is capable of being added to a particular species or if a new species needs to be created. The second analysis tool 258 may, in different embodiments, run on only one of the servers 106, 108, 110, 112, 114, 116, 118 or may run on an independent server (not depicted). The database 105 may store various information and may support various matching and reporting tools used by one or both of the first analysis tool 256 or the second analysis tool 258. An output system/display device 266 may include a user interface, such as a display, keyboard, and pointer that receives interface code generated at the server 104 and displays the information contained in the interface code.

The input system 260 may connect to databases and agencies external to the server 104. In some cases, a user may provide explicit access to this data while in other cases, the data may be publicly available. The databases and agencies may include but are not limited to, credit reporting bureaus, financial institutions, merchants, and advertising databases. The data received via the input system 260 may include information specific to each server, such as account information, money transfers, bill payments and savings to name a few. The data may also include other personal information not directly related to a particular server such as income level. Such a value may be used by the first analysis tool 256 when developing range values involving savings-to-income or debt-to-income. These values may also be used by the second analysis tool 258 when matching a new subject to a species in addition to range values. For example, an income level may be an input of itself.

The first analysis tool 256 may contain one or more algorithms that evaluate the data in a manner specific to the range being evaluated. In some cases certain data received may be used for placing a user on more than one range. For example, a user that is being evaluated with respect to an new or existing species may have more than one range placement influenced by a mortgage level. In one case, the presence and value of a mortgage may affect placement on the mortgage range 214 as well as on the debt range 212. In an embodiment, an algorithm for placement on a range may include a lookup table or graph that weights data received via the input system 260 with respect to a characteristic or trait be evaluated. For example, with respect to the investment range 218, a user may have a portfolio of 30% bonds, 50% stocks, and 20% money market cash. An algorithm may weigh the value of each at +1.5 for stocks, 0.9 for bonds, and cash at −2.0, in the form:

$$f(x)=(\text{stock\_value}*1.5+\text{bond\_value}*0.9-\text{cash\_value}*2.0)/(\text{user total investment value})$$

The value of f(x) is a normalized number that can be placed on an investment range along with other users or a generic representation of a particular species. In other embodiments, various factors may be removed or added, such as annuities, or may be re-weighted. In still other embodiments, the types of stocks may be separated and individually weighted, such as mid-caps, large caps, overseas, etc. The nature and types of the algorithms used to place a user on a range may be specific to the range, to the data available, and to the criteria developed by the system owner. For example, a card issuer may view a species differently from a stock brokerage and may therefore have its own set of data and weights. Similar algorithms and variations may be applied to other characteristics being placed on respective ranges.

The second analysis tool 258 may run on any of the servers 106, 108, 110, 112, 114, 116, 118 or may run on an independent server (not depicted). The second analysis tool 258, in a stable system, matches the characteristics of an individual to a predetermined species. In such a stable system, where thousands or more individuals have been reviewed, the need to add a new species may be rare, for example, occurring when a new market opportunity opens such as a previously unserved country. However, before the system stabilizes, the second analysis tool 258 provides the mechanism for developing different species. When the number of samples of individuals is limited, virtually every new case may result in a new species. The second analysis tool 258 may be programmed with reporting tools that help resolve whether an individual should be classified with an existing species or a new species. For example, rather than using a single distance technique such as average error, a more sophisticated evaluation of individual characteristics may be used, or reported to a human observer who helps make the determination.

In this respect, a machine learning tool 259 may be useful in the characterization of species. Such a tool may run with or in parallel to the second analysis tool 258 and may learn from manual classification of individuals or may have classification rules prepared from an a priori set of guidelines developed on the basis of expected species and the defining traits of each species. For example, all individuals with net investments over $20 million dollars may be placed in a general species that itself may have several sub-species. Similarly, an individual that transfers more than half of his or her income to a foreign location may be classified in a particular species.

The output system 266 may have a display that can be used to output information about a species, an individual, or about a current classification. The first interface tool 256, the second interface tool 258, or both, may include programming that allows generation of interface code in the form of executable instructions that can be sent to the output system 266. The interface code may obtain information about the type of display capabilities available at the output system 266 as well as the platform type in order to correctly generate the interface code for the specific platform. For example, in an embodiment the output system 266 may be a smart phone with a Safari browser or, in another embodiment, may be a desktop computer with Microsoft Windows and a Chrome browser.

Interface code generated for output system 266 may be used to present input data received at the various servers. The interface code may also be used to present information about an individual that is in the process of or has been characterized with respect to other individuals or a species. The interface code itself may be browser-compatible code, such as hypertext markup language (HTML), may be javascript or another interpreted language, or may be compiled executable files automatically generated by a tool dedicated to that purpose.

Figure 6:
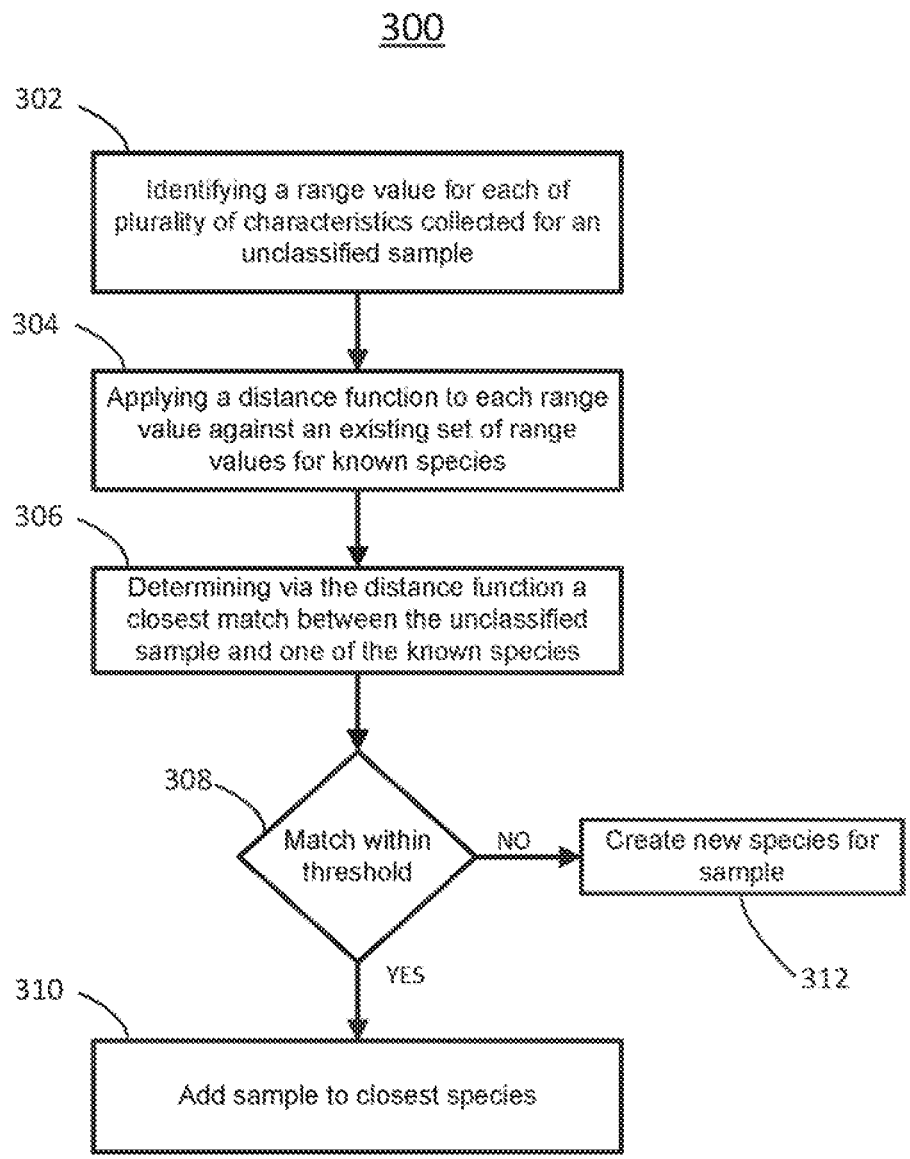
FIG. 6 is a flowchart of a method of performing species characterization.

FIG. 6 is a flowchart of a method 300 of characterizing a sample into a species. At block 302, a range value for each of a plurality of characteristics of an unclassified sample may be identified via a database, machine learning tool, database analysis, or custom algorithm. The range itself may be customized to accommodate an expected selection of data or may be modified as data becomes available to set appropriate limits on the ranges. In various embodiments, the range value for the unclassified sample may be evaluated objectively (e.g., total debt or funds transferred overseas) or may be evaluated subjectively (e.g., aggressive or conservative investor). As discussed above, an algorithm expressed as a formula may be used, or a machine learning tool may perform a value assignment based on a learning model that changes over time.

At block 304, a distance function may be applied to each range value against an existing set of range values. In an embodiment, each existing set of range values may have or be associated with a known species. In early characterizations, the distance function may be applied against other user data when forming the initial species classifications.

A closest match between the unidentified sample and one of the known species may be determined using the distance function at block 306. As discussed above, various matching algorithms may be used to increase or lessen the effect of characteristics of the data, such as outliers, or to weight certain characteristics as being more or less important when making the match.

At block 308, a determination may be made as to whether a level of the closest match between the unclassified sample and the one of the known species reaches a threshold value. That is, in an embodiment, the algorithm or process used to determine the closest species match to the unclassified sample may return a figure of merit reflecting the closeness of the match. The value of the figure of merit may be evaluated with respect to the classification process. Each species may be represented in the comparison process by a generic set of range values determined to be prototypical of the species in one embodiment. In another embodiment, an individual from the species may be selected to represent the species during the comparison process.

When, at block 308, the figure of merit is below a threshold value, the sample may be added to the closest match species by following the 'yes' branch to block 310. When, at block 308, the figure of merit is above the threshold value, a new species may be generated and the sample added as the first member of new species at block 312. After a new species is created, the entire body of user data may be reevaluated using the distance measurement process to determine if other users (that is, other user characteristic data) is closer to the new species than the one that user is currently associated with. The result may be a de-population of certain species and a re-population of the newly created species.

Both users and service providers benefit through the use of the system and techniques described above. When a new species is identified, the associated service requirements can be generated automatically assuming that each characteristic has already been analyzed with respect to the services associated with that characteristic. Over time, new characteristics may be identified that are useful for identifying individuals and species. For example, 20 years ago there was virtually no concept of mobile banking, let alone online check deposits, online mortgage applications, Bitcoin, etc. User acceptance of new technologies will drive service needs into areas not currently contemplated. As these technologies emerge, characteristics associated with their use may be identified and subsequently new services associated with the use of those technologies. The techniques described above help not only identify new species of users but also helps identify the services needed to support those species as they are identified. Users benefit from the availability of state-of-the-art services. Service providers benefit from early identification of trends and the ability to determine what services address the needs of either the most individuals or the most individuals in the target market for that service provider.

The technical effect of these techniques is a system of servers and databases that generates executable code for transportation via a network to an output device that subsequently executes the code in order to display the analyses of the new species and services associated with these species.

The figures depict preferred embodiments for purposes of illustration only. One skilled in the art will readily recognize from the following discussion that alternative embodiments of the structures and methods illustrated herein may be employed without departing from the principles described herein Upon reading this disclosure, those of skill in the art will appreciate still additional alternative structural and functional designs for the systems and methods described herein through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the systems and methods disclosed herein without departing from the spirit and scope defined in any appended claims.

The invention claimed is:

1. A method of characterizing a user into a species, the method comprising:
   receiving, by an input system of a server, activity data related to activity of the user, wherein the user is associated with user accounts, and wherein the activity data comprises transactions of the user accounts;
   classifying, by a first analysis tool of the server, the activity data according to activity categories, wherein the activity categories include at least one of purchases, transfers, bill payments, borrowing activity, savings activity, or investment activity, or a combination thereof;
   identifying, by the first analysis tool of the server, characteristic values based on the activity data, wherein each of the characteristic values corresponds to a different one of the activity categories;
   identifying, by the first analysis tool of the server, a tracking characteristic value for at least one of the activity categories, wherein the tracking characteristic value is identified based on a frequency with which the user electronically accesses information related to at least one of the user accounts, and wherein the characteristic values and the tracking characteristic value define a set of user characteristic values;
   comparing, by a second analysis tool of the server, the set of user characteristic values to sets of species characteristic values based on a distance function, wherein each of the sets of species characteristic values corresponds to a different known species, wherein the distance function generates a sum of distances for each of the known species, and wherein a closest match species corresponds to a lowest sum of distances;
   comparing, by the second analysis tool of the server, the lowest sum of distances to a threshold value;
   characterizing, by the second analysis tool of the server, the user into the closest match species when the lowest sum of distances is below the threshold value; and
   characterizing, by the second analysis tool of the server, the user into a new species when the lowest sum of distances is above the threshold value.

2. The method of claim 1, wherein identifying characteristic values based on the activity data comprises identifying a purchase characteristic.

3. The method of claim 2, wherein identifying characteristic values based on the activity data comprises identifying a transfer characteristic.

4. The method of claim 3, wherein identifying characteristic values based on the activity data comprises identifying a bill payment characteristic.

5. The method of claim 4, wherein identifying characteristic values based on the activity data comprises identifying an investment activity characteristic.

6. The method of claim 5, wherein identifying characteristic values based on the activity data comprises identifying a savings activity characteristic.

7. The method of claim 6, wherein identifying characteristic values based on the activity data comprises identifying a borrowing activity characteristic.

8. The method of claim 1, wherein identifying characteristic values based on the activity data comprises applying, by the second analysis tool of the server, the activity data to a machine learning tool, and wherein the machine learning tool includes a learning model that learns based on prior manual identification of characteristic values.

9. The method of claim 8, wherein the learning model that changes over time.

10. A system for characterizing an individual into a species, comprising:
    a plurality of servers dedicated to receiving activity data corresponding to activity of the individual, wherein the activity data comprises transactions of accounts associated with the individual, wherein each of the plurality of servers corresponds to a different activity category, and wherein the activity categories include at least one of purchases, transfers, bill payments, borrowing activity, savings activity, or investment activity, or a combination thereof;
    at least one tracking server dedicated to receiving tracking data associated with how often the individual electronically accesses information related to the accounts;
    a plurality of input systems, wherein each of the input systems corresponds to a respective one of the plurality of servers and the at least one tracking server, wherein each of the input systems collects the activity data or the tracking data;
    a plurality of database systems, wherein each of the database systems corresponds to a respective one of the plurality of servers and the at least one tracking server, wherein each of the database systems stores the activity data or the tracking data;
    a first analysis tool configured to determine a set of individual placement values for the individual, wherein the set of individual placement values comprises activity placement values corresponding to each of the activity categories and a tracking placement value corresponding to how often the individual electronically accesses information related to the accounts;
    a second analysis tool configured to:
      compare the set of individual placement values against existing sets of placement values for known species based on a distance function, wherein the distance function generates a sum of placement distances for each of the known species, and wherein a closest match species of the known species corresponds to a lowest sum of distances, and
      determine whether the lowest sum of distances satisfies a threshold value;
      responsive to the lowest sum of distances satisfying the threshold value characterize the individual into the closest match species; and
      responsive to the lowest sum of distances failing to satisfy the threshold value characterize the individual as a new species.

11. The system of claim 10, wherein the second analysis tool includes a module that generates a curve based on the set of individual placement values.

12. The system of claim 11, wherein the curve is a first curve, wherein the module generates second curves based on the existing sets of placement values, and wherein the module performs a correlation between the first curve and each of the second curves.

* * * * *